United States Patent
Burns et al.

(10) Patent No.: US 11,323,534 B2
(45) Date of Patent: May 3, 2022

(54) CONCURRENCY REDUCTION THROUGH PUBLISH-SUBSCRIBE PATTERNS

(71) Applicant: International Business Machines Corporation, Armonk, NY (US)

(72) Inventors: Timothy M. Burns, Morrisville, NC (US); Ryan M. Graham, Durham, NC (US); Mark A. Huffman, Durham, NC (US); Hong Ji, Raleigh, NC (US); Todd E. Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1052 days.

(21) Appl. No.: 15/485,511

(22) Filed: Apr. 12, 2017

(65) Prior Publication Data
US 2018/0302487 A1 Oct. 18, 2018

(51) Int. Cl.
*H04L 67/5651* (2022.01)
*H04L 67/63* (2022.01)
*H04L 67/562* (2022.01)

(52) U.S. Cl.
CPC ...... *H04L 67/2828* (2013.01); *H04L 67/2809* (2013.01); *H04L 67/327* (2013.01)

(58) Field of Classification Search
CPC .................................................. H04L 67/2828
See application file for complete search history.

(56) References Cited

U.S. PATENT DOCUMENTS

| | | | |
|---|---|---|---|
| 6,044,404 A * | 3/2000 | Holdsworth | G06F 9/52 709/229 |
| 7,085,758 B2 | 8/2006 | Barsness et al. | |
| 8,332,367 B2 | 12/2012 | Bhattacherjee et al. | |
| 8,935,221 B1 | 1/2015 | Lazier et al. | |
| 9,973,573 B2 * | 5/2018 | Burns | H04L 67/1002 |
| 2010/0138842 A1* | 6/2010 | Balko | G06F 16/24565 718/107 |
| 2016/0020917 A1* | 1/2016 | Tuatini | H04L 41/026 709/206 |
| 2016/0092489 A1 | 3/2016 | Gocek et al. | |
| 2018/0041336 A1* | 2/2018 | Keshava | G06F 21/33 |

FOREIGN PATENT DOCUMENTS

| | | |
|---|---|---|
| CN | 104270431 A | 1/2015 |
| CN | 105930538 A | 9/2016 |
| CN | 106170016 A | 11/2016 |

OTHER PUBLICATIONS

Method of High-speed concurrent processing of user requests of Key-Value database, 2013 (Year: 2013).*
Daya et al., "Micoservices from Theory to Practice Creating Applications in IBM Bluemix Using the Microservices Approach", 2015 (Year: 2015).*
List of related applications; Apr. 2017.

* cited by examiner

*Primary Examiner* — Dawaune A Conyers
(74) *Attorney, Agent, or Firm* — Haley J. McClory

(57) ABSTRACT

Receiving a plurality of concurrent incoming requests from the plurality of services, with each incoming request and each service subscribing to a topic in a shared message queue. The queue is used for: notifying other subscribers when a request to a back-end service is being made; and/or notifying other subscribers when a response from the back-end service is received.

12 Claims, 6 Drawing Sheets

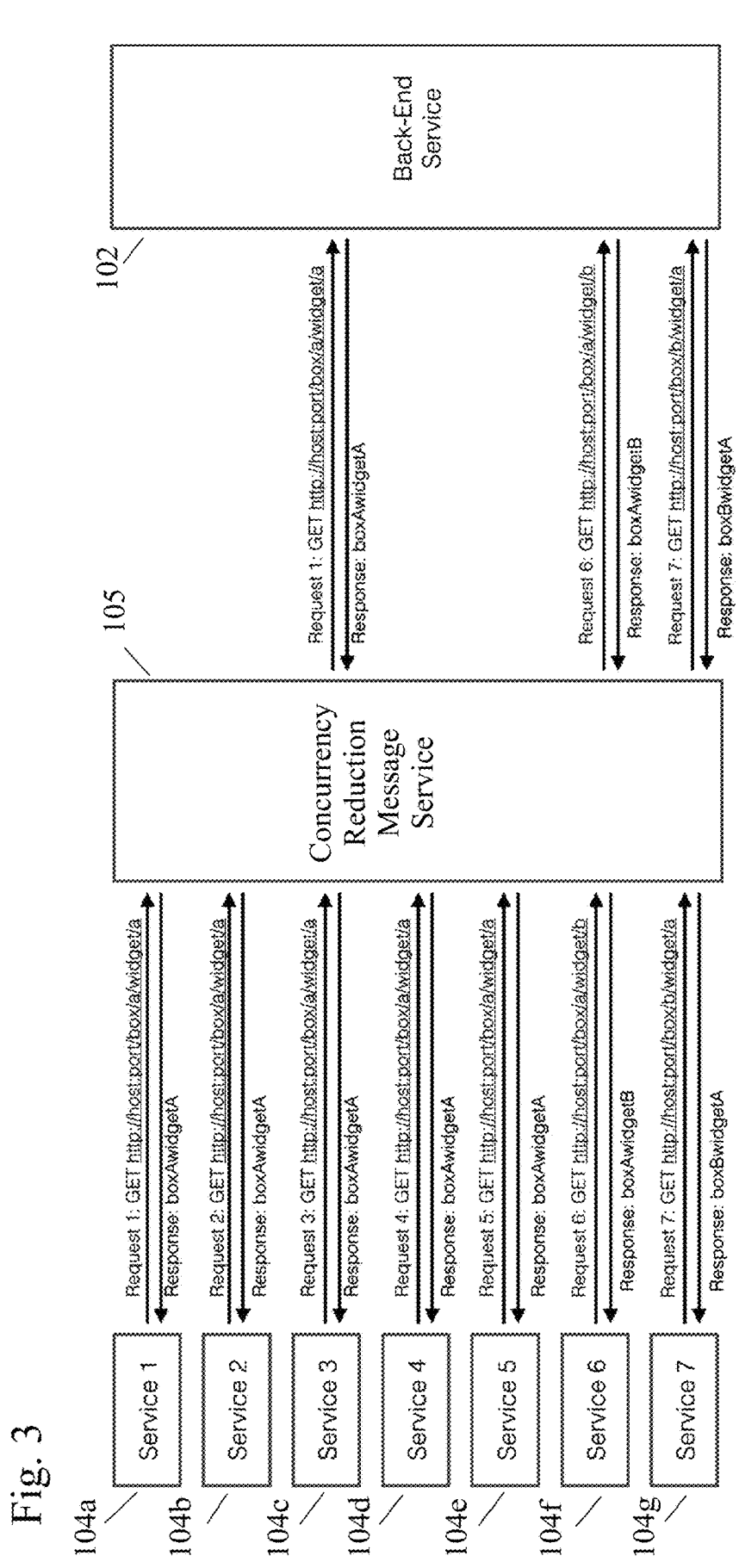

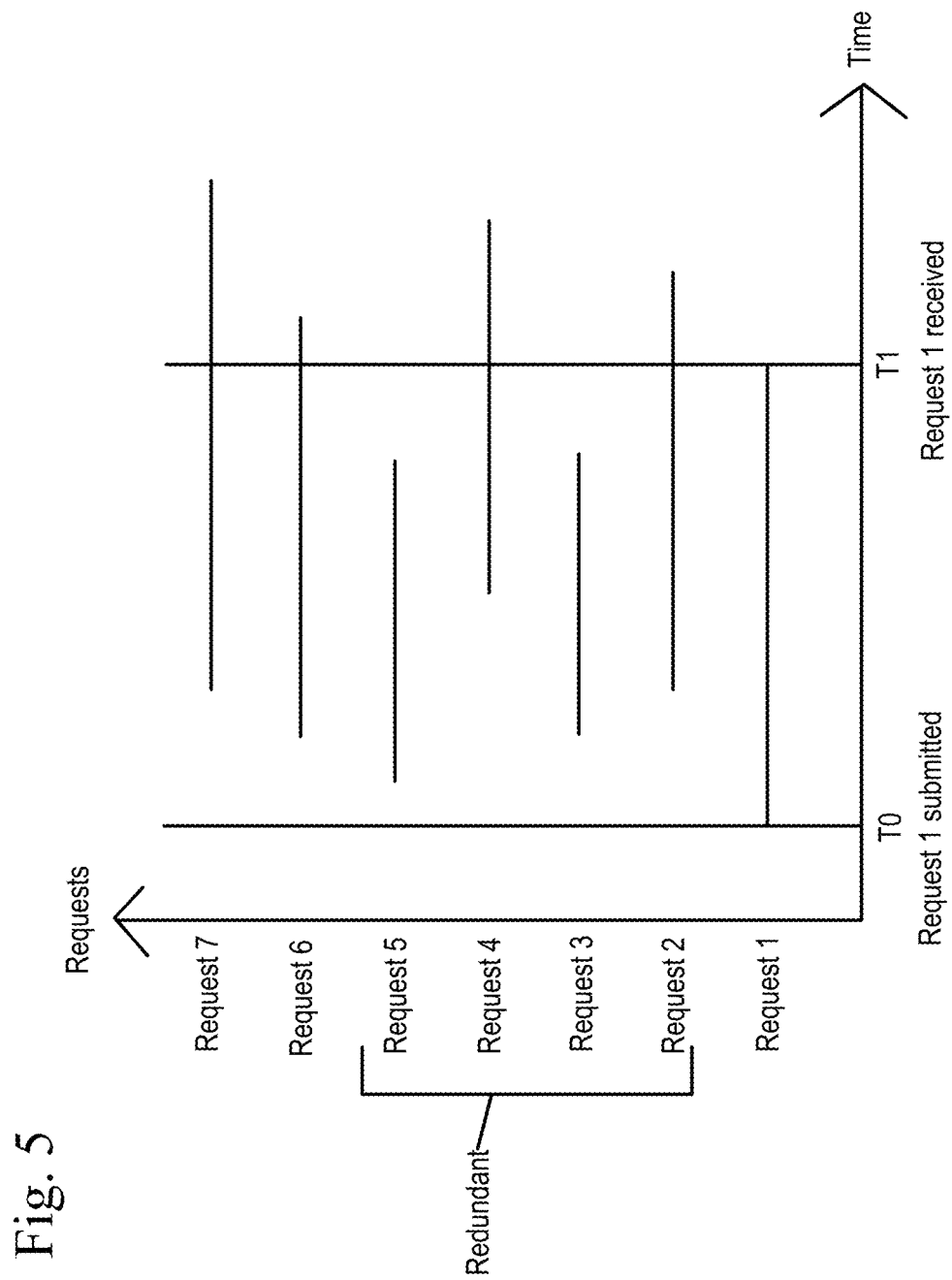

CONCURRENCY REDUCTION THROUGH PUBLISH-SUBSCRIBE PATTERNS

BACKGROUND

The present invention relates to microservices architecture for computer networks to reduce concurrency to a back-end service. More specifically, the present invention relates to concurrency reduction through publish-subscribe patterns.

In a microservices architecture, it is not uncommon for several instances of the same service to perform the same piece of work at the same time. For example, if five instances of the same service all need to retrieve the same data from a back-end, then a system may encounter behavior where the service instances redundantly request the same data five times. This behavior puts unnecessary stress on the back-end service, and may result in delays or extra memory consumption within the service instances. It would be advantageous if there was a way for service instances to recognize scenarios that may lead to redundant traffic, and prevent that redundancy before it happens.

Various technologies exist to either proxy a back-end service or cache data retrieved from a back-end service.

Service-oriented architecture (SOA) is a style of software design where "services" are provided to the other components by application components. Typically, a service: (i) is invoked by a request that includes input parameters; (ii) provides output data based, at least in part, on the input parameters; and (iii) receives the request and provides the output data through a communication protocol over a communication network. The basic principles of SOA are typically independent of vendors, products and/or technologies. A service is typically a discrete unit of functionality that can be accessed remotely and acted upon and updated independently, such as retrieving a credit card statement online, retrieving a stock quote or retrieving a weather forecast update. A service typically has four properties according to one of many definitions of SOA: (i) logically represents a business activity with a specified outcome; (ii) is self-contained; (iii) is a black box for consumers of the service; and (iv) may consist of other underlying services. Different services can be used in conjunction to provide the functionality of a large software application. Service-oriented architecture does not necessarily focus on modularizing an application, but, rather, SOA is typically more about how to compose an application by integration of distributed, separately-maintained and deployed software components.

As the term is used herein, "service" is defined as anything that one skilled in the art of SOA would understand as a service. This does not mean that services must exhibit all of the characteristics of a service set forth in the previous paragraph (for example, an invocation of a "service" does not necessarily involve transmission of data over a communication network). This definition should also not be taken to imply that services can only exist in the context of a proper SOA architecture, but, rather, merely that one of skill in the SOA art would recognize a piece of code as a service.

Service-oriented architecture (SOA) is a style of software design where "services" are provided to the other components by application components. Typically, a service: (i) is invoked by a request that includes input parameters; (ii) provides output data based, at least in part, on the input parameters; and (iii) receives the request and provides the output data through a communication protocol over a communication network. The basic principles of SOA are typically independent of vendors, products and/or technologies. A service is typically a discrete unit of functionality that can be accessed remotely and acted upon and updated independently, such as retrieving a credit card statement online, retrieving a stock quote or retrieving a weather forecast update. A service typically has four properties according to one of many definitions of SOA: (i) logically represents a business activity with a specified outcome; (ii) is self-contained; (iii) is a black box for consumers of the service; and (iv) may consist of other underlying services. Different services can be used in conjunction to provide the functionality of a large software application. Service-oriented architecture does not necessarily focus on modularizing an application, but, rather, SOA is typically more about how to compose an application by integration of distributed, separately-maintained and deployed software components.

As the term is used herein, "service" is defined as any piece of computer code that one skilled in the art of SOA would understand as a service. This does not mean that services must exhibit all of the characteristics of a service set forth in the previous paragraph (for example, an invocation of a "service" does not necessarily involve transmission of data over a communication network). This definition should also not be taken to imply that services can only exist in the context of a proper SOA architecture, but, rather, merely that one of skill in the SOA art would recognize a piece of code as a service.

SUMMARY

According to one embodiment of the present invention, a method of reducing concurrency in a system having a plurality of services sending a plurality of concurrent requests to a back-end service is disclosed. The method comprising the steps of: a service subscribing to a thread of a concurrency reduction message service comprising messages regarding data requested from the back-end service; the service searching the messages in the thread of the concurrency reduction message service to find messages from another service which requested data needed by the service from the back-end service; if the service does not find any messages from other services in the thread of the concurrency reduction message service which requested the data needed by the service, the service: mapping a data request to a key; publishing a message to the thread of the concurrency reduction message service with the key mapped to the data request; adding the key mapped to the data request to a local cache of the service; blocking the thread of the concurrency reduction message service with the published message having the key mapped to the data request; and submitting the key mapped to the data request to the back-end service.

According to another embodiment of present invention, a computer program product for reducing concurrency in a system having a plurality of services sending a plurality of concurrent requests to a back-end service is disclosed. The services each comprising a computer comprising at least one processor, one or more memories, one or more computer readable storage media. The computer program product comprising a computer readable storage medium having program instructions embodied therewith, the program instructions executable by the computer to perform a method comprising: subscribing, by the service computer, to a thread of a concurrency reduction message service comprising messages regarding data requested from the back-end service; searching, by the service computer, the messages in the thread of the concurrency reduction message service to find messages from another service which requested data needed by the service from the back-end service; if the service does not find any messages from other services in the thread of the concurrency reduction message service which requested the data needed by the service, the service computer: mapping a data request to a key; publishing a message to the thread of the concurrency reduction message service with the key mapped to the data request; adding the key mapped to the data request to a local cache of the service; blocking the thread of the concurrency reduction message service with the published message having the key mapped to the data request; and submitting the key mapped to the data request to the back-end service According to another embodiment of the present invention, a computer system for reducing concurrency in a system having a plurality of services sending a plurality of concurrent requests to a back-end service is disclosed. Each of the services comprising a computer comprising at least one processor, one or more memories, one or more computer readable storage media having program instructions executable by the computer to perform the program instructions. The program instructions comprising: subscribing, by the service computer, to a thread of a concurrency reduction message service comprising messages regarding data requested from the back-end service; searching, by the service computer, the messages in the thread of the concurrency reduction message service to find messages from another service which requested data needed by the service from the back-end service; if the service does not find any messages from other services in the thread of the concurrency reduction message service which requested the data needed by the service, the service computer: mapping a data request to a key; publishing a message to the thread of the concurrency reduction message service with the key mapped to the data request; adding the key mapped to the data request to a local cache of the service; blocking the thread of the concurrency reduction message service with the published message having the key mapped to the data request; and submitting the key mapped to the data request to the back-end service.

BRIEF DESCRIPTION OF THE SEVERAL VIEWS OF THE DRAWINGS

FIG. 3 shows a diagram of a concurrency reduction message service.

FIG. 5 shows an example of concurrent requests.

DETAILED DESCRIPTION

Figure 1:
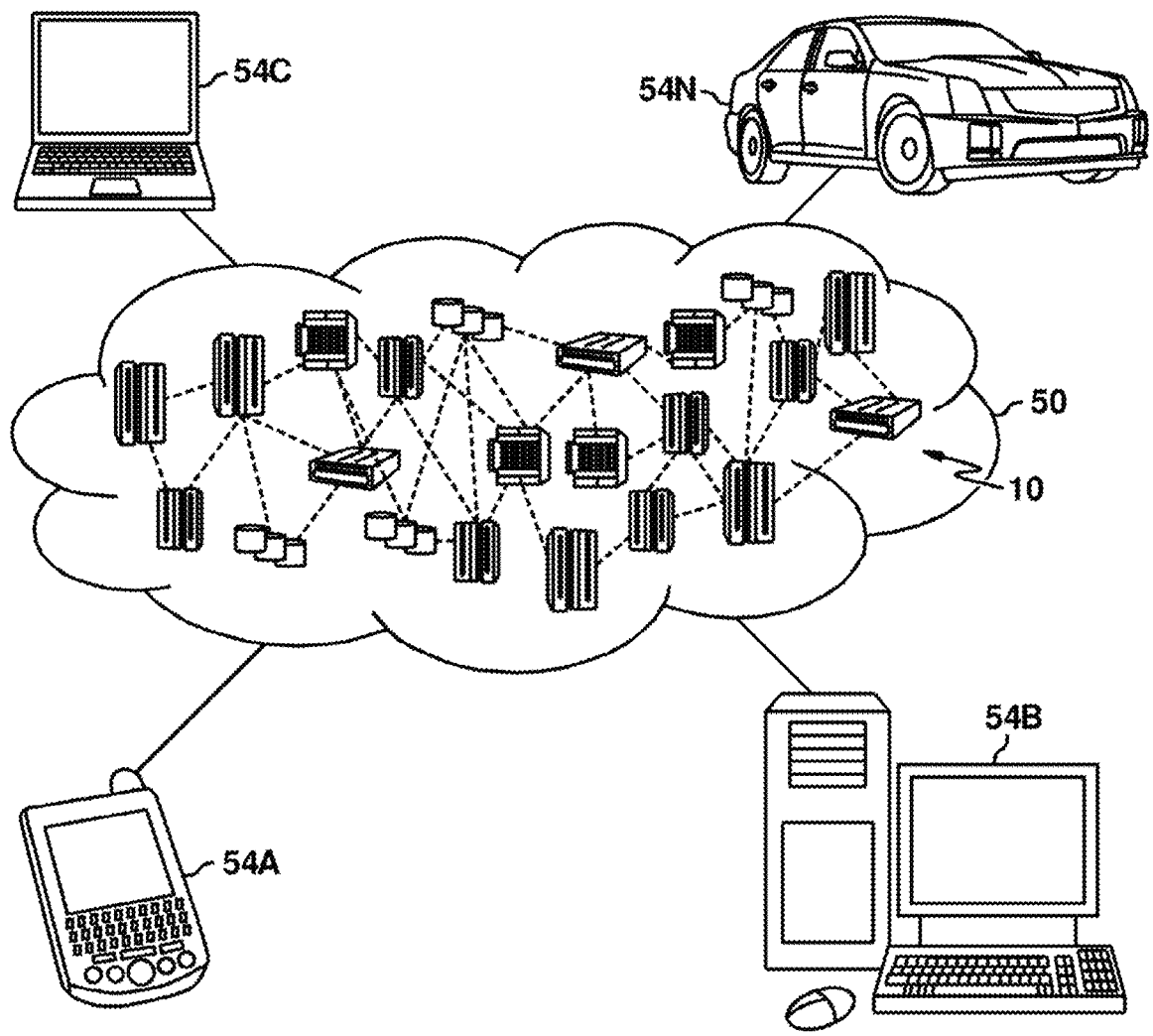
FIG. 1 depicts a cloud computing node according to an embodiment of the present invention.

In an embodiment of the present invention, concurrency reduction is distributed across multiple services in the architecture in order to improve reliability and scalability.

The goal of concurrency reduction is to prevent redundant concurrent requests to the back-end service. A reduction service can optionally cache responses, but more importantly, it prevents multiple requests from being routed to the back-end service at the same time, even if a first response from a service has yet to be received.

Some embodiments of the present invention may include receiving a plurality of concurrent incoming requests from the plurality of services, with each incoming request and each service subscribing to a topic in a shared message queue. In these embodiments, the queue is used for: (i) notifying other subscribers when a request to a back-end service is being made; and/or (ii) notifying other subscribers when a response from the back-end service is received. The publish-subscribe patterns of the message service are the messages and subsequent published responses of the message service, how subscribing services interact with and publish messages to the message services and responses received from the back-end service.

The term "back-end service" is used abstractly to represent any type of remote service that a microservices architecture might rely on for business. For example, the back-end service might be a database, file server, or third-party software application.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
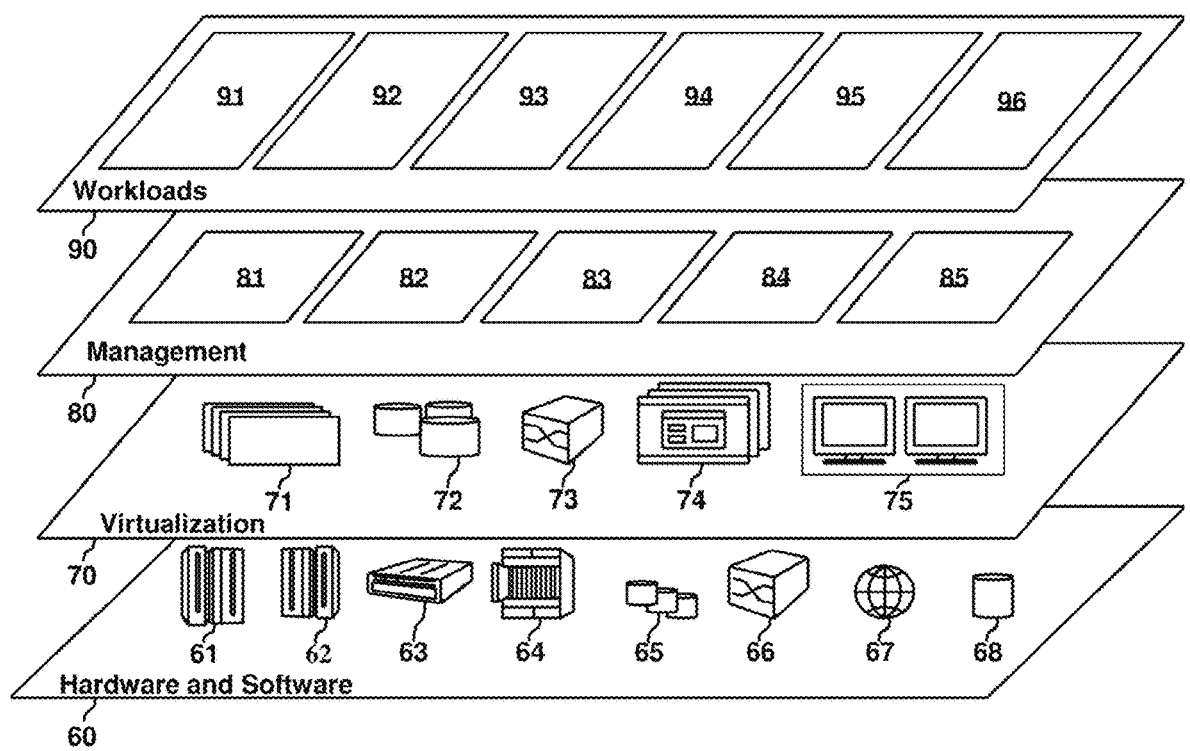
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and concurrency reduction message service 96.

According to one embodiment of the present invention, instead of making a request to the back-end service directly, each service subscribes to topics containing messages in a shared message queue of a concurrency reduction message service. This message queue or service is used to notify other subscribers when a request to a back-end service is being made and to notify other subscribers when a response from the back-end service is received.

Each subscribing service, for examples services 1-7 of FIG. 3, reads every message published to a topic of the message service 105 in order to observe which requests are currently active for other subscribing services. More specifically, whenever a subscribing service 1-7 reads a message indicating that a request was submitted, an entry is added to a local cache of the service 1-7. Whenever a subscribing service 1-7 receives a message indicating that a response was received, the subscribing service 1-7 maps that response to an entry in the local cache of the subscribing service 1-7, and the subscribing service 1-7 clears that entry from the local cache. Since each individual subscribing service 1-7 is able to observe all active requests in the architecture through its local cache, it is able to reduce redundancy by blocking its own message threads when redundant requests arise. These redundant message threads block additional messages being added by the subscribing service 1-7 until a response appears on the message queue.

In an embodiment of the present invention, concurrency reduction occurs without relying on a single point of failure, because each subscribing service 1-7 in the architecture is able to both submit requests to the back-end service 102 directly and re-use responses collected by other subscribing services 1-7 in the architecture. The advantage of distributed concurrency reduction architecture is that it is more resilient and scalable than architecture with a single Concurrency Reduction Service, acting as a single point of failure.

FIG. 3 shows a concurrency reduction system with a messaging system.

Seven services 104a-104g are subscribed to a concurrency reduction message service 105. The message service 105 contains a plurality of threads, with each of the threads containing a plurality of messages. Within the messages is data regarding requests made to the back-end service 102. The data can additionally contain a request key corresponding to the request to the back-end service 102, time of the request, response, if received, and corresponding threads, as well as other data.

Examples of a messages are:
Message 1:
Request Key: http:host:port/boxA/widget/a
Response: (no response yet)
Message 2:
Request Key: http:host:port/boxA/widget/b
Response: ("answer":42)

Seven requests, denoted as request 1 to request 7, from seven services 104a-104g, are to be sent to a back-end service 102. It will be understood that while seven services 104a-104g are shown in the figure, any number of services can be handled within the teaching of the invention.

In FIGS. 3 and 5, services 104a-104e are sending requests 1-5 asking for "boxAwidgetA". Service 104f is sending request 6 for "boxAwidgetB" and service 104g is sending request 7 for "boxBwidgetA". These requests are all being sent "concurrently". As the term is used herein, "concurrency" is defined as multiple service requests occurring within a predetermined, common interval of time, with the interval of time being considered to be negligibly small in the context of the type of output data and/or action being provided by the service of the service request. For example, if the requested service outputs data related to a massively multi-player video game, then things may change in the virtual world of the game within a fraction of a second, and users receiving the output data would want to be in a position to be dynamically responsive within that quick timeframe—meaning that the predetermined concurrency time interval should be designed to be very short in that context. As a further example, a service that provides the position of a glacier would not be particularly time sensitive, meaning that the predetermined concurrency time interval could be made relatively long.

Returning attention to the embodiment of FIGS. 3 and 5, if the intermediate concurrency reduction message service 105 was not present, in this example, Services 1-7 each send requests 1-7 directly to the back-end service, and the back-end service 102 sends responses directly to the requesting service. If Service 1 makes a request for resource "boxAwidgetA" at time 0 (T0) and receives a response at time 1 (T1), then T0 and T1 define the boundaries of a concurrent request proximity for boxAwidgetA. In FIG. 5, services 2-5 also request boxAwidgetA, and if the requests are between T0 and T1, then those requests would qualify for concurrency reduction through the concurrency reduction messaging service 105. In other words, requests 2-5 are redundant if they request the same resource while request 1 is already retrieving that resource.

If there were no concurrency reduction messaging service 105, this would result in seven separate requests being handled by the back-end service 102, and seven separate responses from the back-end service would result.

Each of the services 1-7 review message threads in the messaging service to determine whether the current request is active for other subscribing services.

Within the message threads, subscribing service 1 104a has already made a request (request 1) for "boxAwidgetA" to the back-end service and has not yet received a response from the back-end service 102. Other subscribing services, services 2, 3, 4, and 5 read the message thread and stores or maps the key mapped to the request and associated thread(s) by service 1 in the local cache of services 2, 3, 4, and 5. Since the key for the request of "boxAwidgetA" is stored in the local cache of services 2, 3, 4, and 5, the subscribing service is blocked from posting a message to the associated thread requesting the same request of "boxAwidgetA". Services 2, 3, 4 and 5 wait for a response to be published by service 1.

The local cache may have the following entries:
Entry A:
Request Key: http://host:port/widget/c
Waiting Threads A, B
Timeout: 2:00 PM
Entry B:
Request Key: http://host:port/widget/d
Waiting Threads: (none)
Timeout: 2:01 PM Service 1, once a response is received, publishes a message with the response to the service request of the back-end service to the same thread, notifying all services waiting for a response for the same request.

Service 6 requested "boxAwidgetB", through request 6. Since this request has not been published in any of the message threads, service 6 creates a key corresponding to or mapped to the request for "boxAwidgetB", stores the key in the local cache of service 6. Service 6 then publishes a message within a thread for the request of "boxAwidgetB" and blocks additional messages from being posted in the thread. Service 6 then requests "boxAwidgetB" from the back-end service 102. When a response is received from the back-end service, Service 6 unblocks the thread, publishes the response to the request in a message within the same thread and removes the key from its local cache. Similar steps are taken for the request of "boxBwidgeA" by service 7.

By using the concurrency reduction message service 105, there are only three requests—request 1, request 6 and request 7—sent to the back-end service 102, however responses to requests are being satisfied for requests 1, 2, 3, 4, 5, 6, and 7 through the shared message queue of the subscribed services 1-7. Thus, the five concurrent requests for "boxAwidgetA"—requests 1-5—from subscribed services 104a-104e are reduced to one request by the concurrency reduction message service 105. The reduction occurs by checking to see if the same key, and thus associated active requests, are present in the local cache. If the same key already exists in the shared message service, the specific thread for the services would be blocked until a response is received from the back end service 102. When this response is received from the back-end service 102, the service publishes the response of "boxAwidgetA" to the shared message queue for subscribed services with requests 2-5 which requested the same response from the back-end service 102.

If no response appears to a request made to the back-end service 102 within a reasonable amount of time (for example, if a 5 second timeout expires), then the service could notify all blocking threads that a timeout has occurred or the service could publish a new message to the topic to notify other subscribers that it will service the request instead. Then, the other subscribers would reset their timeout periods to allow the new service to complete the request. A maximum retry mechanism could be introduced to prevent an infinite loop in the case where the back-end service becomes unresponsive.

Figure 4A:
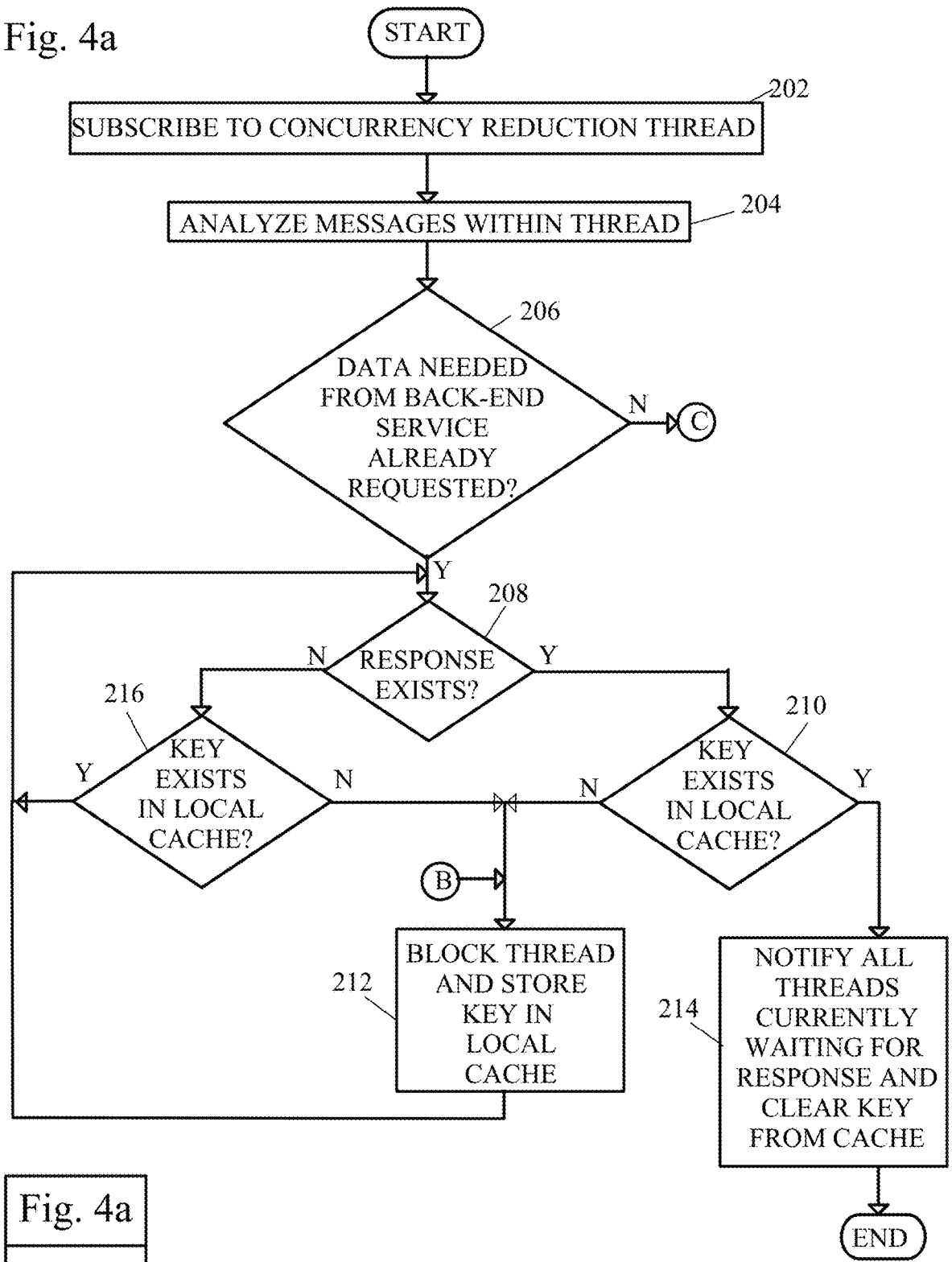
FIGS. 4a-4b show a flow diagram of a method of subscribing to a concurrency reduction message service.
Figure 4B:
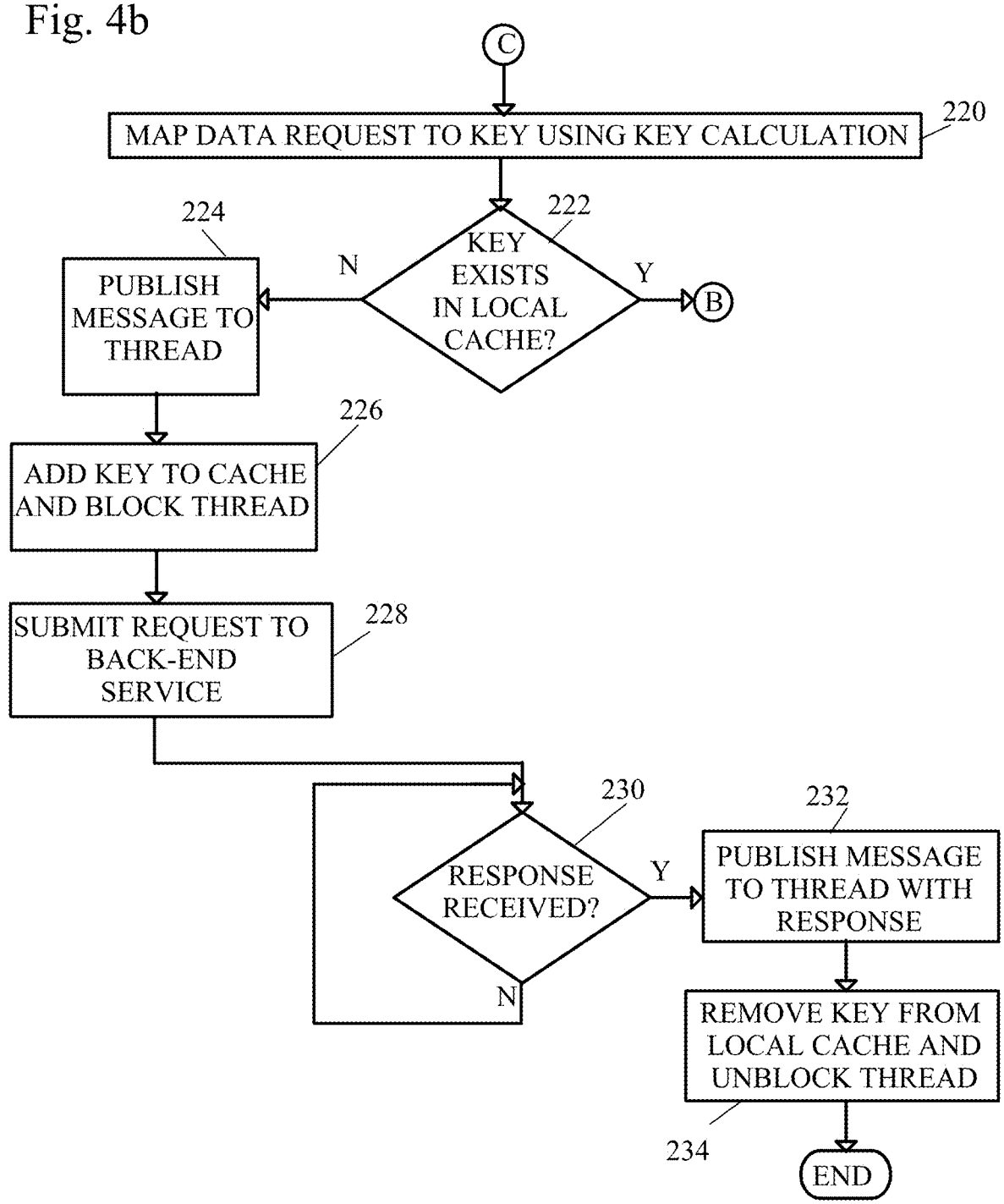

FIGS. 4a-4b show a flow diagram of a method of subscribing to a concurrency reduction message service.

In a first step, a service subscribes to a concurrency reduction thread of a concurrency reduction message service (step 202). The service analyzes the messages within the thread (step 204). It should be noted that a service can subscribe to one or more threads of the concurrency reduction message service.

If data needed by a service from the back-end service has already been requested (step 206), the service determines whether a response exists to the request within the thread (step 208).

If a response is present from the back-end service for the request (step 208) and a key mapped to the request is present in the local cache of the service (step 210), all threads which are waiting for a response to the request are notified with the requested information from the back-end service and the associated keys with the request stored in the local cache of the service are cleared from the cache (step 214) and the method ends.

If a response is present from the back-end service for the request (step 208) and a key mapped to the request is absent from the local cache of the service (step 210), the thread(s) with the request are blocked by the service from posting further messages and the key mapped to the request is stored in the local cache of the service (step 212). The method then returns to step 208 of determining whether a response exists for the request.

If a response is not present from the back-end service for the request (step 208), and a key exists in the local cache of the service (step 216), the method returns to step 208 of determining whether a response exists for the request.

If a response is not present from the back-end service for the request (step 208) and a key does not exist in the local cache of the service (step 216), the thread(s) with the request are blocked by the service from posting further messages and the key associated with the request is stored in the local cache of the service (step 212). The method then returns to step 208 of determining whether a response exists for the request.

If data needed by service from the back-end service has not been requested (step 206), the data to be requested is mapped to a key using a key calculation function (step 220).

For each request, the service maps each incoming request to a key. In some embodiments of the present invention, each incoming request to the concurrency reduction message service 105 is assigned a key based, at least in part, upon the information (for example, URL address) being requested. The information being requested will correspond to a resource of a predetermined set of resources that may be requested. An example of a key may be http://host:port/boxA/widget/a. The Concurrency Reduction Message Service 105 makes the key. The key it chooses to use may be provided directly from the requesting service 104a-104g as the full URL string (such as "http://host:port/box/a/widget/a"), or the Concurrency Reduction Message Service 105 could be configured to use a meaningful substring of the URL that uniquely defines the requested resource (such as "box/a/widget/a" or "box-a-widget-a" or simply "a-a").

In some embodiments, the identity of the resource being requested will fully determine the key. Keys added as new requestable resources are added to the system and reallocated, or dropped, when resources are removed. If the system includes a few thousand requestable resources, then a sixteen-bit key may be used.

The bit strings of the keys and their corresponding requestable resources may be stored, for example, in a look-up table. This look-up table can be stored in a fast cache or kernel, for example, or just stored in ordinary Random Access Memory (RAM).

In some embodiments, the key may be based upon additional information in addition to an identity of a resource about which information is being requested. This additional information could include, for example, information regarding use and processing of the requested information when that information is returned from the back-end service 102 to the requesting service.

For example, assume a request includes a request for a URL address and further includes the following code:
?cache=true This code indicates that the information should be cached at the Concurrency Reduction Message Service 105 for a predetermined period of time after the URL information is returned from the back-end service 102. In other words, the requesting services 104a-104g would be using "?cache=true" to indicate that cached (and potentially stale) data is acceptable in the response, or using "?cache=false" to indicate that potentially stale data is *not* acceptable, and therefore must be fetched from the back-end service 102.

The requesting service 104a-104g can either be given the reduction key as a header/parameter of the request, or the requesting service 104a-104g can calculate the key based on the request itself. For example, if the Uniform Resource Identifier (URI) of the request complies with the representational state transfer (REST) architecture (usually referred to as a "RESTful string"), then the key might be generated by inspecting the path and query parameters of the URI.

Alternatively, a key-calculation function could be configured in the reduction service itself, and different key-calculation functions could be specified for different routes. For example, a key-calculation function A might be applied to requests originating from one particular domain, while a key-calculation function B might be applied to requests originating from all other domains.

If a key exists in the local cache of the service (step 222), the thread(s) with the request are blocked by the service and the key associated with the request is stored in the local cache of the service (step 212). The method then returns to step 208 of determining whether a response exists for the request. The term "blocked" means that the local service will cause the threads to "sleep" or "wait" until the response becomes available. In other words, the blocked threads will sit idle (without consuming significant CPU resources) until they are notified that a response is available.

If a key is not present in the local cache of the service (step 222), the service publishes a message with the request key or key (step 224). The request key is added to the local cache of the service and the thread is blocked by the service (step 226).

The service then uses the request key to request the resource from the back-end service 102 (step 228).

When a response a response is received from the back-end service (step 230), the service publishes a message with the response (step 232). The service then removes the key from the local cache and unblocks the threads (step 234) and the method ends.

When a response has been received, the method may continue to monitor for a response by returning to step 230. In one embodiment, if a time period elapses that is greater than threshold, the service could notify all blocking threads that a timeout has occurred or the service could publish a new message to the topic to notify other subscribers that it will service the request instead. Then, the other subscribers would reset their timeout periods to allow the new service to complete the request. A maximum retry mechanism could be introduced to prevent an infinite loop in the case where the back-end service becomes unresponsive.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of reducing concurrency in a system having a plurality of services sending a plurality of concurrent requests to a back-end service, the method comprising the steps of:
　a service computer subscribing over a network to a thread of a concurrency reduction message service comprising messages regarding data requested from the back-end service, wherein the messages are viewable to each of the plurality of services;
　the service computer searching the messages in the thread of the concurrency reduction message service to find messages from another service which requested data needed by the service computer from the back-end service;
　for a non-occurrence of any messages from other services in the thread of the concurrency reduction message service which requested the data needed by the service, the service computer configured to:
　　map a data request to a key;
　　publish a message to the thread of the concurrency reduction message service with the key mapped to the data request, wherein publishing the message notifies each of the plurality of services waiting for a similar data request;
　　add the key mapped to the data request to a local cache of the service;
　　block the thread of the concurrency reduction message service with the published message having the key mapped to the data request;
　　submit the key mapped to the data request to the back-end service;
　　receive a response from the back-end service;
　　publish a message with the response to the data request to the thread of the concurrency reduction message service;
　　remove the key from the local cache of the service; and
　　unblock the thread of the concurrency reduction message service with the published message having the key mapped to the data request;
　the service computer finds a message which requested the data needed by the service computer from other services in the thread of the concurrency reduction message service.

2. The method of claim 1, wherein when a response is not received from the back-end service within a time period, the service computer configured to notify all blocked threads that a timeout has occurred.

3. The method of claim 2, further comprising the service computer publishing a new message to the thread notifying other subscribers that another service can make the same request to the back-end service after notifying all blocked threads that timeout occurred.

4. The method of claim 1, wherein determining the service computer finds the message which requested the data needed by the service computer from other services in the thread of the concurrency reduction message service, the service computer configured to:
　determine a response exists to the message which requested the data needed by the service computer from other services in the thread of the concurrency reduction message service;
　determine a response does not exist to the message which requested the data needed by the service computer from other services in the thread of the concurrency reduction message service, then waiting for a response to appear in the thread; and
　determine a response does exist to the message which requested the data needed by the service computer from other services in the thread of the concurrency reduction message service, then:
　　determining the key mapped to the data requested has been stored in a local cache of the service;
　　determine the key mapped to the data requested has been stored in a local cache of the service, then notifying the threads mapped to the key waiting for a response from the back-end service with the response to the data request and clearing the key from the local cache; and
　　determine the key mapped to the data requested has not been stored in a local cache of the service, then blocking the thread of the concurrency reduction message service containing the message which requested the data needed by the service computer from other services and storing the key in the local cache of the service computer.

5. A computer program product for reducing concurrency in a system having a plurality of services sending a plurality of concurrent requests to a back-end service, the services each comprising a computer comprising at least one processor, one or more memories, one or more computer readable storage media, the computer program product comprising a computer readable storage medium having program instructions embodied therewith, the program instructions executable by the computer to perform a method comprising:
　subscribing, by the service computer, to a thread of a concurrency reduction message service comprising messages regarding data requested from the back-end service, wherein the messages are viewable to each of the plurality of services;
　searching, by the service computer, the messages in the thread of the concurrency reduction message service to find messages from another service which requested data needed by the service computer from the back-end service;
　for a non-occurrence of any messages from other services in the thread of the concurrency reduction message service which requested the data needed by the service computer, the service computer configured to:
　　map a data request to a key;

publish a message to the thread of the concurrency reduction message service with the key mapped to the data request, wherein publishing the message notifies each of the plurality of services waiting for a similar data request;

add the key mapped to the data request to a local cache of the service;

block the thread of the concurrency reduction message service with the published message having the key mapped to the data request;

submit the key mapped to the data request to the back-end service;

receive a response from the back-end service;

publish a message with the response to the data request to the thread of the concurrency reduction message service;

remove the key from the local cache of the service; and unblock the thread of the concurrency reduction message service with the published message having the key mapped to the data request;

and finding, by the service computer, a message which requested the data needed by the service computer from other services in the thread of the concurrency reduction message service.

6. The computer program product of claim 5, wherein when a response is not received from the back-end service within a time period, configured to notify, by the service computer, all blocked threads that a timeout has occurred.

7. The computer program product of claim 6, further comprising publishing, by the service computer, a new message to the thread notifying other subscribers that another service can make the same request to the back-end service after notifying all blocked threads that timeout has occurred.

8. The computer program product of claim 5, wherein determining the service computer finds the message which requested the data needed by the service computer from other services in the thread of the concurrency reduction message service, the service computer configured to:

determine a response exists to the message which requested the data needed by the service computer from other services in the thread of the concurrency reduction message service;

determining a response does not exist to the message which requested the data needed by the service computer from other services in the thread of the concurrency reduction message service, then waiting for a response to appear in the thread; and determining a response does exist to the message which requested the data needed by the service computer from other services in the thread of the concurrency reduction message service, then the service computer:

determining the key mapped to the data requested has been stored in a local cache of the service;

determining the key mapped to the data requested has been stored in a local cache of the service, then notifying the threads mapped to the key waiting for a response from the back-end service with the response to the data request and clearing the key from the local cache; and the key mapped to the data requested has not been stored in a local cache of the service, then blocking the thread of the concurrency reduction message service containing the message which requested the data needed by the service computer from other services and storing the key in the local cache of the service.

9. A computer system for reducing concurrency in a system having a plurality of services sending a plurality of concurrent requests to a back-end service, each of the services comprising:

a service computer comprising at least one processor, one or more memories, one or more computer readable storage media having program instructions executable by the service computer to perform the program instructions comprising:

subscribing, by the service computer, to a thread of a concurrency reduction message service comprising messages regarding data requested from the back-end service, wherein the messages are viewable to each of the plurality of services; searching, by the service computer, the messages in the thread of the concurrency reduction message service to find messages from another service which requested data needed by the service computer from the back-end service;

wherein the service computer does not find any messages from other services in the thread of the concurrency reduction message service which requested the data needed by the service computer, the service computer:

mapping a data request to a key;

publishing a message to the thread of the concurrency reduction message service with the key mapped to the data request, wherein publishing the message notifies each of the plurality of services waiting for a similar data request;

adding the key mapped to the data request to a local cache of the service;

blocking the thread of the concurrency reduction message service with the published message having the key mapped to the data request;

submitting the key mapped to the data request to the back-end service;

publishing a message with the response to the data request to the thread of the concurrency reduction message service;

removing the key from the local cache of the service; and unblocking the thread of the concurrency reduction message service with the published message having the key mapped to the data request;

receiving, by the service computer, a response from the back-end service; and finding, by the service computer, a message which requested the data needed by the service computer from other services in the thread of the concurrency reduction message service.

10. The computer system of claim 9, wherein when a response is not received from the back-end service within a time period, notifying, by the service computer, all blocked threads that a timeout has occurred.

11. The computer system of claim 10, further comprising publishing, by the service computer, a new message to the thread notifying other subscribers that another service can make the same request to the back-end service after notifying all blocked threads that timeout has occurred.

12. The computer system of claim 9, wherein determining the service computer finds the message which requested the data needed by the service computer from other services in the thread of the concurrency reduction message service, the service computer:

determining a response exists to the message which requested the data needed by the service computer from other services in the thread of the concurrency reduction message service;

determining a response does not exist to the message which requested the data needed by the service computer from other services in the thread of the concurrency reduction message service, then waiting for a response to appear in the thread; and determining a response does exist to the message which requested the data needed by the service computer from other services in the thread of the concurrency reduction message service, then the service computer:

determining the key mapped to the data requested has been stored in a local cache of the service;

determining the key mapped to the data requested has been stored in a local cache of the service, then notifying the threads mapped to the key waiting for a response from the back-end service with the response to the data request and clearing the key from the local cache; and determining the key mapped to the data requested has not been stored in a local cache of the service, then blocking the thread of the concurrency reduction message service containing the message which requested the data needed by the service computer from other services and storing the key in the local cache of the service computer.

* * * * *